United States Patent [19]

Rosenberg et al.

[11] Patent Number: 5,437,241
[45] Date of Patent: Aug. 1, 1995

[54] DIFFERENTIAL PRESSURE INDICATOR

[75] Inventors: Gary C. Rosenberg, Safety Harbor; Frank Gossett, Seminole, both of Fla.

[73] Assignee: Pall Corporation, East Hills, N.Y.

[21] Appl. No.: 283,557

[22] Filed: Aug. 1, 1994

Related U.S. Application Data

[63] Continuation of Ser. No. 255,877, Jun. 8, 1994.

[51] Int. Cl.$^6$ .................................................. G01L 19/12
[52] U.S. Cl. ..................................... 116/268; 116/267; 116/272
[58] Field of Search ....... 116/267, 268, 272, DIG. 25, 116/DIG. 42; 200/81.9 M, 82 E; 210/90; 340/607, 611

[56] References Cited

U.S. PATENT DOCUMENTS

| | | | |
|---|---|---|---|
| 3,626,474 | 12/1971 | Hammer | 137/554 |
| 3,785,332 | 1/1974 | Silverwater | 116/70 |
| 4,172,971 | 10/1979 | Silverwater et al. | 200/82 E |
| 4,205,702 | 6/1980 | Silverwater | 137/557 |
| 4,205,703 | 6/1980 | Silverwater | 137/557 |
| 4,651,670 | 3/1987 | Silverwater | 116/268 |
| 5,188,728 | 2/1993 | Traonvoez et al. | 210/90 |

FOREIGN PATENT DOCUMENTS

891246 3/1960 United Kingdom .

*Primary Examiner*—William A. Cuchlinski, Jr.
*Assistant Examiner*—Willie Morris Worth
*Attorney, Agent, or Firm*—Leydig, Voit & Mayer

[57] ABSTRACT

A differential pressure indicator includes a housing having first and second pressure ports for fluid and a bore communicating with the pressure ports. A piston is movable in the bore between an actuated and an unactuated position in response to a pressure differential between the first and second pressure ports. A sensor senses movement of the piston between the actuated and the unactuated positions. A fluid control mechanism varies the effective surface area of the piston communicating with the first pressure port when the piston is in the unactuated position in accordance with variations in temperature of fluid at one of the pressure ports. The indicator is thereby prevented from actuating at low temperatures at which the fluid has a high viscosity.

21 Claims, 5 Drawing Sheets

DIFFERENTIAL PRESSURE INDICATOR

REFERENCE TO RELATED APPLICATIONS

This application is a continuation of application Ser. No. 08/255,877, filed on Jun. 8, 1994.

BACKGROUND OF THE INVENTION

1. Field of the Invention

This invention relates to a differential pressure indicator for indicating when the difference in fluid pressure between two locations exceeds a predetermined level. More particularly, it relates to a differential pressure indicator which does not operate when the fluid viscosity is high.

2. Description of the Related Art

In fluid systems equipped with a filter element, it is frequently important to determine when the filter element has become clogged by particles in the fluid being filtered. For example, clogging of an oil filter for a jet engine is undesirable because it can result in significant wear or even serious damage to the moving parts of the engine. Clogging of a filter element can be detected by measuring the pressure drop (the pressure differential) across the filter element, which increases as the clogging progresses. Therefore, it is common to monitor the condition of the filter element by measuring the pressure differential between the upstream and downstream sides of the filter element with a differential pressure indicator. When the pressure differential reaches a predetermined value indicative of clogging of the filter element, the filter element can be replaced or cleaned. Differential pressure indicators for this purpose have been developed which actuate at a predetermined differential pressure across a filter element to produce a visual or electrical signal which alerts a user of the filter system of the need to replace the filter element.

The differential pressure across a filter element is a function not only of the degree of clogging of the filter element but also of the viscosity of the fluid being filtered. Namely, the higher the viscosity, the greater is the differential pressure. With many fluids, viscosity increases as the fluid temperature decreases. For example, at the time of start up of an engine, the lubricating oil for the engine is much colder and more viscous than at normal engine operating temperatures. During start up, the high viscosity of the oil may cause the differential pressure across an oil filter to exceed a value indicative of clogging of the filter element, even though the filter element is not actually clogged. Accordingly, in order to prevent a false indication of clogging, a differential pressure indicator for a filter system is frequently equipped with an arrangement referred to as a thermal lockout device which prevents actuation of the indicator when the fluid is at a temperature producing a high viscosity.

A typical thermal lockout device for a differential pressure indicator employs a bimetallic element to prevent actuation of the indicator when the fluid of which the pressure is being measured is below a prescribed temperature. However, a bimetallic element is difficult to adjust. Furthermore, the bimetallic element is usually in contact with the atmosphere rather than directly in contact with the fluid being filtered. Therefore, the bimetallic element can not accurately sense the temperature of the fluid.

SUMMARY OF THE INVENTION

It is an object of the present invention to provide a differential pressure indicator which has a simple structure and which does not actuate at low fluid temperatures.

It is another object of the present invention to provide a differential pressure indicator for fluids which is highly responsive to changes in the fluid temperature.

A differential pressure indicator according to one form of the present invention includes a housing having first and second pressure ports and a bore communicating with the pressure ports. A piston is movable in the bore between an actuated and an unactuated position in response to a pressure differential between the first and second pressure ports. A sensor senses movement of the piston between the actuated and the unactuated positions. A fluid control mechanism varies the effective surface area of the piston communicating with the first pressure port when the piston is in the unactuated position in accordance with variations in the temperature of fluid at one of the pressure ports.

In one preferred embodiment, the fluid control mechanism increases the effective surface area of the piston communicating with a high pressure port at a predetermined fluid temperature. When the fluid temperature is below the predetermined temperature and the fluid viscosity is high, the effective surface area of the piston communicating with the high pressure port is sufficiently low that the piston will not actuate under typical operating conditions. Thus, at a low fluid temperature, the indicator is prevented from giving a false indication that a filter element has become clogged.

In another preferred embodiment, the fluid control mechanism decreases the effective surface area of the piston communicating with a high pressure port at a predetermined temperature. When the fluid temperature is below the predetermined temperature and the fluid viscosity is high, fluid at the pressure of the high pressure port acts on the piston in a direction preventing the piston from actuating, so the indicator cannot give a false indication that a filter element has become clogged.

The fluid control mechanism may include a shuttle member and a biasing member made from a shape memory alloy having a transition temperature and drivingly connected to the shuttle member. At the transition temperature, the biasing member drives the shuttle member to a position in which it varies the effective surface area of the piston communicating with the first pressure port.

Preferably, the biasing member is in direct communication with the fluid of which the differential pressure is being sensed so that the biasing member can directly respond to changes in the fluid temperature. For example, the biasing member can be immersed in the fluid.

The sensor can be any device capable of sensing the movement of the piston. In a preferred embodiment, the sensor is magnetically coupled to a magnet mounted on the piston and senses movement of the magnet. Alternatively, the sensor can be mechanically connected to the piston.

A differential pressure indicator according to the present invention is particularly suitable for measuring the differential pressure across a filter element, but the indicator can be employed in any fluid system in which it is desired to determine the difference between the fluid pressures at two points, and is not restricted to use with filter elements. The fluid employed in the fluid system can be a liquid, a gas, or mixtures of more than one phase.

DESCRIPTION OF PREFERRED EMBODIMENTS

Figures 1, 2:
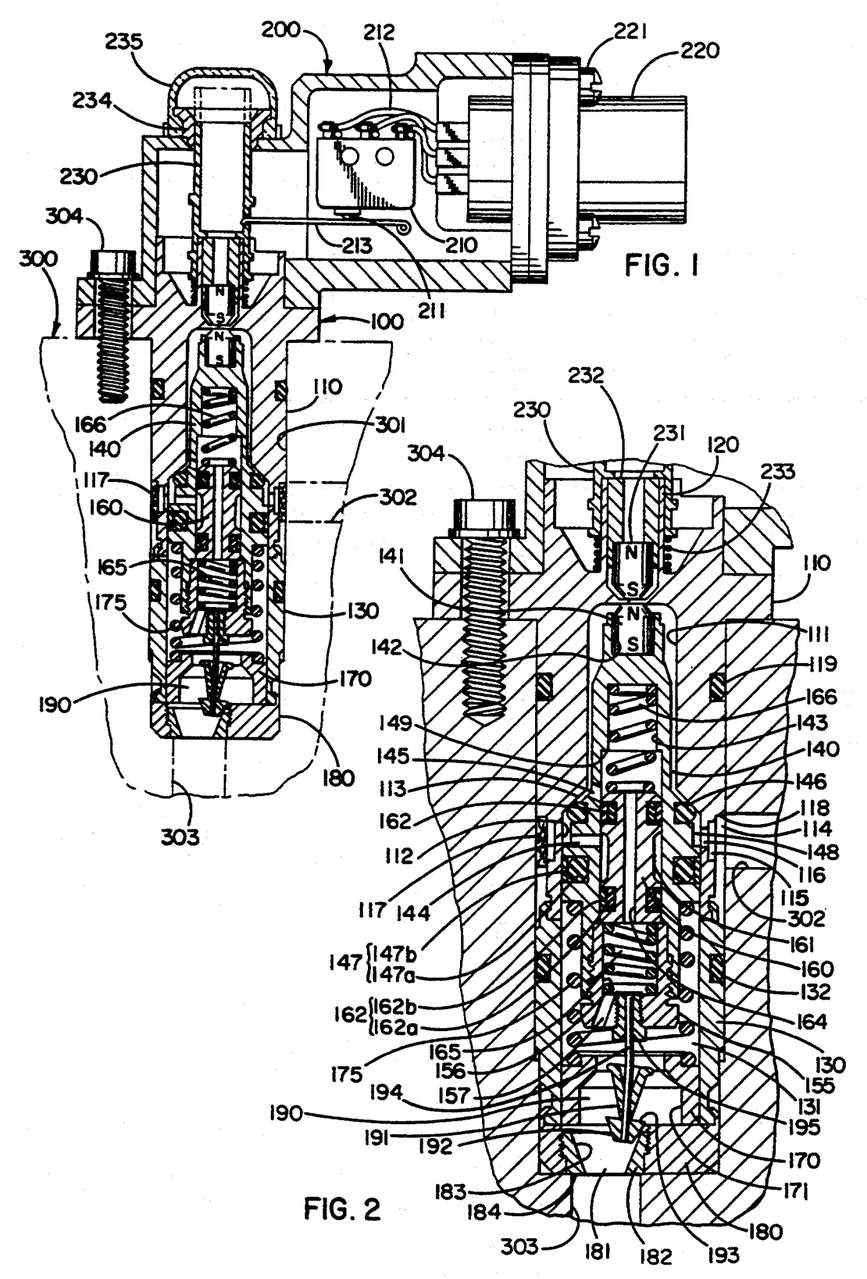
FIG. 1 is a cross-sectional elevation of an embodiment of a differential pressure indicator according to the present invention.
FIG. 2 is an enlarged cross-sectional view of the piston housing of the embodiment of FIG. 1 as it appears when a fluid being filtered is cold.

FIG. 1 illustrates a preferred embodiment of a differential pressure indicator according to the present invention applied to a fluid system including an unillustrated filter element. The fluid system in this embodiment is a lubrication system for an engine, and the filter element is an oil filter, but as stated above, the present invention is not restricted to use with any particular type of fluid system.

The indicator includes a piston housing 100 which fits into a bore 301 in a filter housing 300, shown in phantom, and a switch housing 200 which is mounted on the piston housing 100 on the outside of the filter housing 300. The piston housing 100 contains a piston 140 which moves in response to the pressure differential between the upstream and downstream sides of the unillustrated filter element disposed in the filter housing 300. The switch housing 200 contains a microswitch 210 which operates in response to the movement of the piston 140.

The piston housing 100 includes an upper housing section 110, a lower housing section 130, and a retainer 180 connected to one another in series. In the figures, the piston housing 100 is disposed with its longitudinal axis extending substantially vertically so that the upper housing section 110 is located above the lower housing section 130. However, the orientation of the longitudinal axis of the piston housing 100 with respect to the vertical is arbitrary, and the axis could be horizontal or at any angle between the horizontal and vertical. Furthermore, the indicator can be positioned so that it is upside down with respect to its orientation in FIG. 1.

A longitudinally extending bore is formed in the upper housing section 110, and a longitudinally extending bore 131 coaxial with the bore in the upper housing section 110 is formed in the lower housing section 130. The piston 140 is slidably received in these bores. As shown in FIG. 2, which is an enlarged view of a portion of FIG. 1, the bore in the upper housing section 110 includes a first cylindrical section 111 and a second cylindrical section 112 coaxial with and having a larger diameter than the first cylindrical section 111. The first and second cylindrical sections 111 and 112 are joined by a sealing surface 113 having a generally frustoconical shape. The upper end of the first cylindrical section 111 is closed off.

An upstream pressure port 114 is formed in the wall of the upper housing section 110 to provide fluid communication between the second cylindrical section 112 and the external surface of the upper housing section 110. On its outer periphery, the upstream pressure port 114 communicates with a passage 302 for fluid formed in the filter housing 300. This passage 302 communicates with the upstream side of the unillustrated filter element. The upstream pressure port 114 includes an annular groove 115 extending in the circumferential direction around the upper housing section 110 and at least one radial passage 116 extending between the annular groove 115 and the inner surface of the second cylindrical section 112. A sleeve-shaped filter element 117 is mounted in a recess 118 formed in the outer surface of the upper housing section 110 adjoining the annular groove 115 to prevent contaminants from entering the indicator, since the upstream pressure port 114 is in communication with fluid that has not passed through the filter element. A sealing member such as an O-ring 119 is mounted in an annular recess extending around the upper housing section 110 to form a seal between the upper housing section 110 and the bore 301 in the filter housing 300.

The lower housing section 130 is connected to the upper housing section 110 by any suitable method, such as swaging, which can create a rigid and fluid-tight connection between the two sections. Alternatively, the two housing sections can be replaced by a single housing section, or the piston housing 100 may have three or more sections. A sealing member such as an O-ring 132 is mounted in an annular recess extending around the lower housing section 130 to form a seal between the lower housing section 130 and the bore 301 in the filter housing 300 on the opposite side of the upstream pressure port 114 from O-ring 119.

The piston 140 is slidably received in the bores of the upper and lower housing sections 110 and 130 for reciprocating movement in the longitudinal direction of the piston 140. The shape of the piston 140 is not critical. In this embodiment it has generally the shape of a body of revolution that is symmetric about its longitudinal axis. A permanent magnet 141 is mounted in a recess 142 in the upper end of the piston 140 and is secured to the piston 140 by a suitable method, such as by swaging. A longitudinally extending bore 143 is formed inside the piston 140, and a shuttle member in the form of a flow control spool 160 is slidably received inside the bore 143 for reciprocating movement in the longitudinal direction of the piston 140. The spool 160 functions to control the effective surface area of the piston 140 communicating with the upstream pressure port 114. The bore 143 is shown as coaxial with the longitudinal axis of the piston 140, but the exact location of the bore 143 is not critical. Two passages 144 and 145 are formed between the bore 143 and the outer surface of the piston 140. When the piston 140 is in the position shown in FIGS. 1 and 2, passage 144 communicates between the bore 143 and the second cylindrical section 112, while passage 145 communicates between the bore 143 and the first cylindrical section 111 of the upper housing section 110. A sealing member 146 such as an O-ring capable of forming a fluid-tight seal against the sealing surface 113 of the upper housing section 110 is mounted on the outside of the piston 140 between the two passages 144 and 145. Another sealing member 147 comprising, for example, an O-ring 147a surrounded by a glyd seal 147b is mounted on the piston 140 on the opposite side of passage 144 from sealing member 146 and creates a sliding, fluid-tight seal against the inner surface of the piston housing 110. The outer surface of the piston 140 between the two sealing members 146 and 147 is shaped so that a chamber 148 communicating with the upstream pressure port 114 surrounds the piston 140, and the outer end of passage 144 communicates with this chamber 148.

Sealing member 146 need not seal against a frustoconical surface like sealing surface 113 and may seal against any suitable surface of the upper housing section 110 between passages 144 and 145. For example, sealing member 146 can be a sliding seal like seal member 147 which seals against a cylindrical surface such as the first cylindrical section 111 or the second cylindrical section 112.

Figures 3, 4:
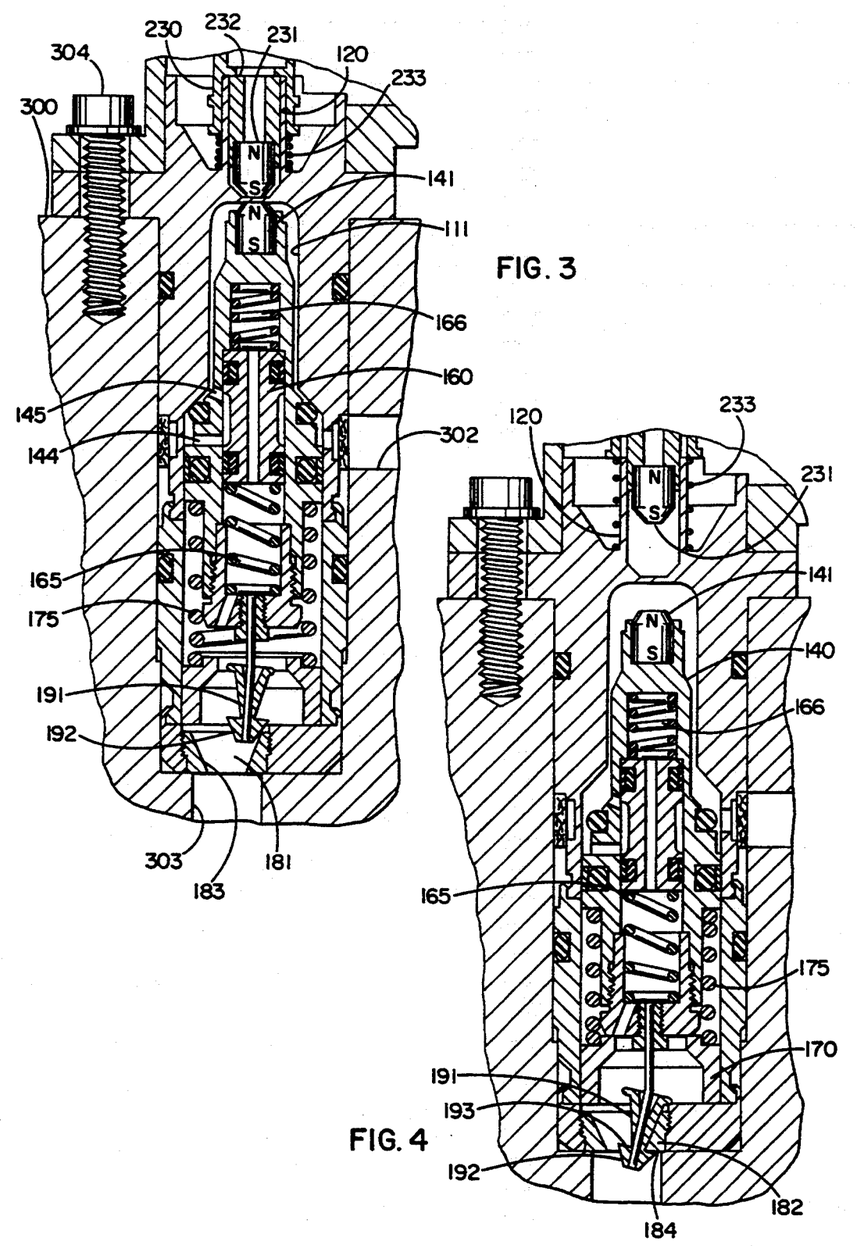
FIG. 3 is an enlarged cross-sectional view similar to FIG. 2 showing the piston in an unactuated state when the fluid is warm.
FIG. 4 is an enlarged cross-sectional view similar to FIG. 2 showing the piston in an actuated state when the fluid is warm.
Figure 5:
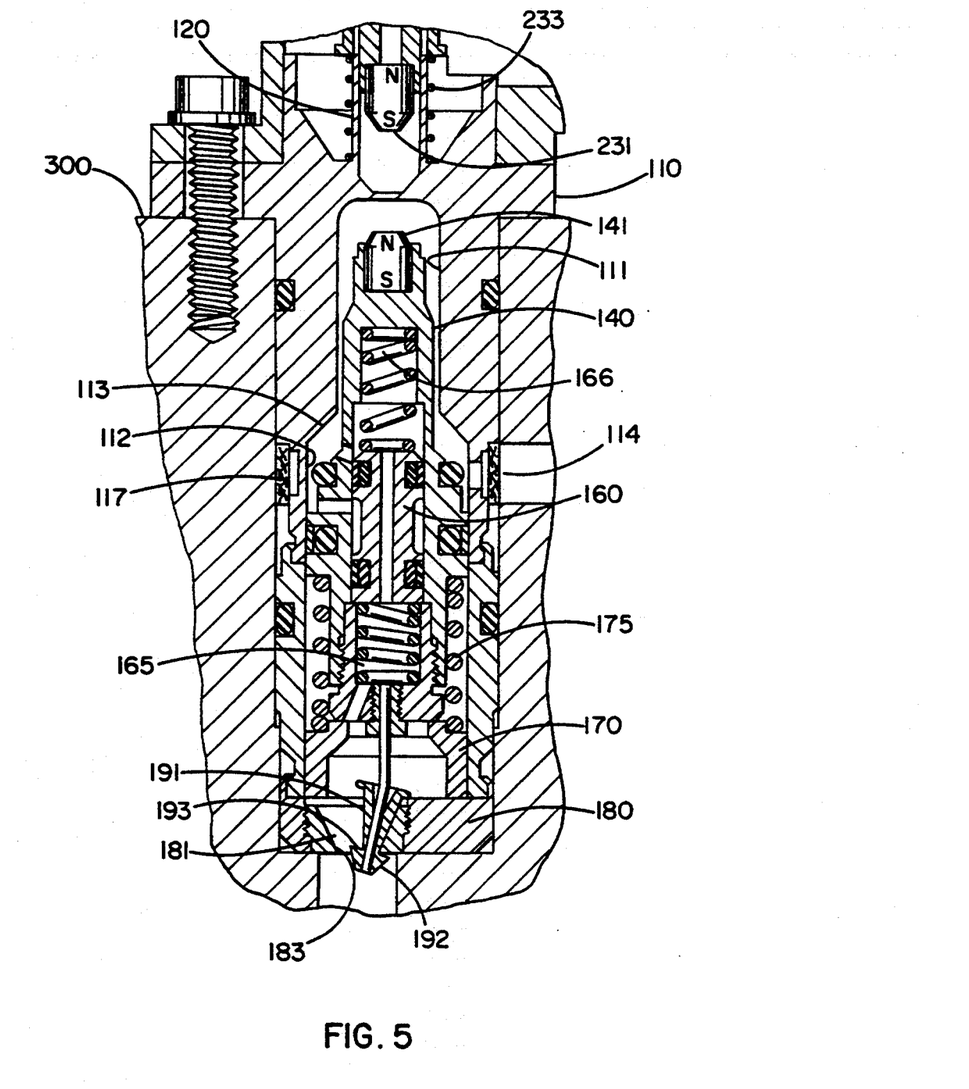
FIG. 5 is an enlarged cross-sectional view similar to FIG. 2 showing the piston as it appears subsequent to actuation and after the fluid has returned to a cold state.

The piston 140 can linearly move between an unactuated position shown in FIGS. 1–3 and an actuated position shown in FIGS. 4–5. Since the piston 140 is vertically disposed in the figures, the unactuated position will be referred to as a raised position, and the actuated position will be referred to a lowered position. However, since the orientation of the axis of the piston 140 with respect to the vertical is arbitrary, the indicator could be rotated by 180 degrees so that the piston 140 is higher when in the actuated position than in the unactuated position. When the piston 140 is in the raised position, sealing member 146 is pressed into sealing contact with the sealing surface 113 so that fluid from the upstream pressure port 114 can not flow along the outside of the piston 140 from the chamber 148 surrounding the piston 140 into the first cylindrical section 111 of the upper housing section 110. In its lowered position, the piston 140 abuts against a piston stop 170 disposed inside the lower housing section 130, and sealing member 146 is spaced from the sealing surface 113 of the upper housing section 110. The piston 140 is biased toward the raised position by a biasing member in the form of a helical range spring 175 compressed between a flange 152 on the piston 140 and a seat formed on the top of the piston stop 170. The range spring 175 can be made of any elastic material compatible with the fluid being filtered, such as those materials conventionally used for compression springs. The range spring 175 is selected such that when the first cylindrical section 111 and the second cylindrical section 112 of the first housing section 110 are at the pressure of the upstream pressure port 114 and the bore 131 of the second housing section 130 is at the pressure of the downstream pressure port 181, the piston 140 will actuate, i.e., move from its raised position to its lowered position at a predetermined actuation differential pressure between pressure ports 114 and 181.

The spool 160 can shuttle along a linear path inside bore 143 between a lowered position shown in FIG. 2 and a raised position shown in FIG. 3. In the raised position, the upper end of the spool 160 abuts against a ledge 149 formed in the bore 143 of the piston 140. The spool 160 has a midportion 161 having a smaller outer diameter than the end portions of the spool 160. Sealing members 162 comprising an O-ring 162a surrounded by a glyd seal 162b, for example, are mounted on the periphery of the spool 160 on either side of the midportion 161 to form a fluid-tight seal between the spool 160 and the bore 143 of the piston 140. When the spool 160 is in the lowered position, one of the sealing members 162 is disposed between passage 144 and passage 145, so the two passages are isolated from one another. When the spool 160 is in the raised position, there is no longer one of the sealing members 162 disposed between the two passages 144 and 145, so the passages are in fluid communication with each other through the space surrounding the midportion 161 of the spool 160, and fluid can flow from the second cylindrical section 112 to the first cylindrical section 111 of the upper housing section 110 through the passages 144 and 145. The spool 160 thus functions as a fluid control valve for controlling fluid communication between passages 144 and 145. Passage 145 is formed in the piston 140 in a position such that when the spool 160 is in its lowered position, passage 145 is in fluid communication with the portion of bore 143 located above the spool 160.

A shuttle member for controlling fluid communication between passages 144 and 145 need not have the shape of the spool 160. For example, instead of having a midportion 161 of reduced diameter, it could have internal passages which connect passages 144 and 145 when suitably aligned.

A passage 164 for fluid is preferably formed in the spool 160 between its upper and lower ends so that both ends are at the same fluid pressure. The passage 164 is illustrated as coaxial with the longitudinal axis of the spool 160, but the location of this passage 164 is not critical.

A spring retainer 155 is screwed into a threaded recess in the piston 140 at the lower end of bore 143. When the spool 160 is in its lowered position, it abuts against the upper surface of the spring retainer 155, which acts as a stop. A recess 156 is formed in the spring retainer 155, and a passage 157 for fluid extends through the bottom wall of the spring retainer 155 between the recess 156 and the inside of the bore 131 in the lower housing section 130.

The position of the spool 160 inside the piston 140 is determined by two biasing members in the form of a first helical compression spring 165 and a second helical compression spring 166. The first compression spring 165 is disposed inside the recess 156 in the spring retainer 155 and is used to bias the spool 160 toward its raised position. The first compression spring 165 is surrounded by the fluid being filtered, which fills the recess 156 of the spring regainer 155 through passage 157. The second compression spring 166 is disposed between the spool 160 and the blind end of bore 143 and biases the spool 160 toward its lowered position.

The second compression spring 166 is a helical spring which can be made of a conventional material, such as steel, typically used to manufacture compression springs. The mechanical properties of such a material generally will not significantly vary over the temperature range in which the indicator is operated. In contrast, the first compression spring 165 is a helical spring made of a shape memory alloy which undergoes a significant change in its mechanical properties at a prescribed transition temperature, which is selected to be within the operating temperature range of the indicator. The modulus of elasticity, i.e., the stiffness of the shape memory alloy significantly increases when the temperature of the alloy exceeds the transition temperature, and the alloy attempts to assume a predetermined remembered shape, regardless of the shape which it assumed below the transition temperature. The remembered shape of the first compression spring 165 is that of a helical spring having an axial length in a relaxed (uncompressed) state which is greater than the distance from the bottom surface of the recess 156 in the spring retainer 155 to the bottom surface of the spool 160 when the spool 160 is in its raised position. When the first compression spring 165 is at a temperature below the transition temperature, the spring force exerted by the second compression spring 166 exceeds that exerted by the first compression spring 165, so the latter is deformed into a compressed shape as shown in FIG. 2 and the spool 160 is forced to its lowered position in which it contacts the upper surface of the spring retainer 155. In fact, the stiffness of the first compression spring 165 below the transition temperature may be so low that the first compression spring 165 in its compressed shape exerts virtually no upward biasing force on the spool 160. When the temperature of the first compression spring 165 exceeds the transition temperature, the first compression spring 165 attempts to assume its remembered shape, and its stiffness increases so that the spring force which it exerts is now greater than the spring force exerted by the second compression spring 166. As a result, the first compression spring 165 abruptly changes to an expanded shape, shown in FIG. 3, in which the spool 160 is moved by the spring 165 to its raised position and its upper end is forced against the ledge 149 in bore 143.

Any type of shape memory alloy having a transition temperature which can be set to a desired value in the operating temperature range of the indicator can be used in the present invention. The most readily available shape memory alloys are Ni-Ti alloys, but other types can be employed, such as Cu-based shape memory alloys and ferrous-group shape memory alloys. The transition temperature of a shape memory alloy depends not only on the alloy composition but on processing conditions such as heat treatment conditions, which are well known to manufacturers of shape memory alloys. A shape memory alloy having a desired transition temperature and remembered shape can be obtained from a number of suppliers, such as Raychem Corporation of Menlo Park, California, Shape Metal Applications of Sunnyvale, California, Special Metal Corporation of New Hartford, New York, and TiNi Alloy Company of San Leandro, California. The remembered shape of the alloy is not critical as long as the spring force of the first compression spring 165 when it tries to assume its remembered shape is greater than the spring force exerted by the second compression spring 166.

The transition temperature of the shape memory alloy can be selected based on the relationship between the viscosity of the fluid being filtered and temperature. The pressure drop across a filter element increases with increasing viscosity of the fluid being filtered, and the viscosity decreases with increasing temperature. Furthermore, the pressure drop across a filter element increases as the filter element becomes loaded with particulate matter. For a given filter element and fluid system, there will be a differential pressure across the filter element at normal operating temperatures at which it is desirable to replace the filter element because of clogging. This will be referred to as the replacement differential pressure of the filter element, and the actuation differential pressure of the piston 140 is preferably approximately the same as or somewhat less than the replacement differential pressure. The transition temperature is selected such that when the fluid is at this temperature and the filter element is being operated under normal flow conditions, the viscosity of the fluid will be such that the pressure drop across the filter element will not exceed the replacement differential pressure unless the filter element actually needs replacement.

The transition temperature of a shape memory alloy usually exhibits some hysteresis. Namely, the transition of the alloy from a first state of relatively low stiffness to a second state in which the alloy has a higher stiffness and tries to assume its remembered shape occurs at a higher temperature than a transition from the second state back to the first state. This hysteresis is not necessary to the operation of the indicator, but it may be advantageous in that it increases the stability of operation of the indicator.

Below the transition temperature, it is not necessary for the first compression spring 165 to exert any biasing force on the spool 160. However, preferably there is some contact or connection between the first compression spring 165 and the spool 160 so that when the first compression spring 165 expands, there will not be any sudden impact of the spring 165 against the spool 160.

The passages 144 and 145 are arranged so that they communicate with one another when the spool 160 is in its raised position. However, by changing the location of passage 145, the two passages can be made to communicate with one another when the spool 160 is in its lowered position. In this case, the locations of the first and second compression springs 165 and 166 would be interchanged so that the spool 160 would be forced to its raised position by the second compression spring 166 when the fluid temperature was below the transition temperature of the shape memory alloy and would be forced to its lowered position by the first compression spring 165 when the fluid temperature rose to the transition temperature.

In this embodiment, a helical compression spring, i.e., the first compression spring 165 is used as a biasing member to bias the spool 160 upward, but a biasing member for the spool 160 need not have the shape of a helical spring. As long as the upward force exerted by the biasing member on the spool 160 is less than the downward force exerted by the second compression spring 166 below the transition temperature and greater than that force above the transition temperature, the shape memory alloy can be formed into any desired shape. For example, it can be formed into a Belleville spring or a spring washer which expands to drive the spool 160 upwards when the shape memory alloy reaches its transition temperature. Similarly, the second compression spring 166 need not be a helical spring and may have any shape enabling it to downwardly bias the spool 160.

Instead of employing two compression springs 165 and 166, it is possible to employ two tension springs which pull the spool 160 between its raised and lowered positions rather than pushing it. For example, the first compression spring 165 can be replaced by a first tension spring made of a conventional spring material, and the second compression spring 166 can be replaced by a second tension spring made of a shape memory alloy. Each tension spring would have one end secured to the inside of bores 143 or 156 and a second end secured to the spool 160. The spring characteristics of the two springs would be selected such that below the transition temperature of the shape memory alloy, the tensile force exerted by the spring of conventional spring material would be greater than that exerted by the spring of the shape memory alloy so that the spool 160 would be pulled to its lowered position, and above the transition temperature of the shape memory alloy, the spring made of the shape memory alloy would exert a greater tensile force than the other spring and pull the spool 160 to its raised position.

The shape memory alloy employed in this embodiment for the first compression spring 165 has a single remembered shape, i.e., an expanded shape which it attempts to assume above the transition temperature. However, it is also possible to manufacture a shape memory alloy having two remembered shapes, i.e., a first remembered shape which it tries to assume above a transition temperature and a second remembered shape which it tries to assume below the transition temperature. The first compression spring 165 may be manufactured from such a shape memory alloy, with the first remembered shape being the expanded shape shown in FIG. 3 and the second remembered shape being the compressed shape shown in FIG. 2. In this case, if the first compression spring 165 is secured to the spool 160 so as to be capable of both pushing and pulling the spool 160, the second compression spring 166 becomes unnecessary, since the contraction of the first compression spring 165 to its second remembered shape can pull the spool 160 to its lowered position when the fluid temperature falls below the transition temperature.

The piston stop 170 is a generally tubular member disposed inside the lower end of the lower housing section 130. The upper portion of the piston stop 170 includes a stopping surface for contacting the piston 140. A passage 171 for fluid is formed between the upper and lower ends of the piston stop 170.

The retainer 180 is rigidly secured to the lower housing section 130 by any suitable method, such as swaging. It serves to react downward forces applied to the piston stop 170. A downstream pressure port 181 is formed in the retainer 180 between its top and bottom surfaces and communicates between the bore 171 in the piston stop 170 and a passage 303 formed in the filter housing 300 and communicating with the downstream side of the filter element. The inside of the lower housing section 130 and the inside of the recess 156 of the spring retainer 155 are filled with fluid at the same pressure as the downstream pressure port 181, and fluid within the portion of bore 143 of the piston 140 lying above the spool 160 is likewise at the pressure of the downstream pressure port 181. Due to the provision of passage 157 in the spring retainer 155, the fluid in the recess 156 of the spring retainer 155 is at substantially the same temperature as the fluid passing through the filter element. A hollow insert 182 having external threads is screwed into internal threads formed in the downstream pressure port 181. The insert 182 has a frustoconical guide surface 183 along its inner periphery which slopes inward from its top end to its bottom end and a flat lower surface 184 adjoining the lower end of the guide surface 183. In the figures, the lower surface 184 is shown flush with the bottom surface of the retainer 180, but the position of the lower surface 184 can be varied by changing the amount by which the insert 182 is screwed into the retainer 180.

The piston 140 is equipped with a latch mechanism 190 for latching the piston 140 in its lowered position. The latch mechanism 190 is of conventional structure and includes a latch cone 191 secured to the retainer 155 by means of a latch screw 195 which screws into the lower end of the retainer 155 and a latch 194 wire extending between the latch screw 195 and the latch cone 191. The latch cone 191 has a frustoconical peripheral surface 192 and a ledge 193 adjoining the upper end of the peripheral surface 192. The peripheral surface 192 is slidable along the guide surface 183 of the insert 182. The latch wire 194 is made of a resilient material which is bent so as to bias the peripheral surface 192 of the latch cone 191 against the guide surface 183. When the piston 140 moves to its lowered position, the ledge 193 of the latch cone 191 engages with the bottom surface 184 of the insert 182 and prevents the piston 140 from moving back to its raised position. The latch cone 191 can be disengaged from the retainer 180 by an unillustrated release lever mounted on the filter housing 300. The release lever is a standard component of a latch mechanism of the type shown here, and the structure and operation of the release lever are well know to those skilled in the art. The provision of the latch mechanism 190 is optional, but it is useful because it prevents the indicator from accidentally being reset due to vibrations.

The outer surface of the upper portion of the piston 140 above passage 145 is separated from the inner surface of the first cylindrical section 111 of the bore of the upper housing section 110 by an annular gap. Passage 145 communicates with the annular gap, so the fluid pressure within the gap acting downward on the upper portion of the piston 140 is always the same as the pressure within passage 145.

The position of the piston 140 within the piston housing 100 is determined by the sum of the fluid forces acting upwardly and downwardly on the piston 140 and the upwardly acting force of the range spring 175. The fluid force acting on any portion of the piston 140 in the axial direction is the product of the fluid pressure and the effective surface area of that portion, wherein the effective surface area is the area of a projection of the portion on a plane perpendicular to the axis of the piston 140. The inside of chamber 148 between sealing members 146 and 147 is always at the pressure of the upstream pressure port 114, while the bore 131 of the lower housing section 130 is always at the pressure of the downstream pressure port 181. When the piston 140 is in its raised position, the pressure within the first cylindrical section 111 of the upper housing section 110 depends upon the position of the spool 160. When the spool 160 is in its lowered position, the first cylindrical section 111 is at the pressure of the downstream pressure port 181, and when the spool 160 is in its raised position, the first cylindrical section 111 is at the pressure of the upstream pressure port 114. The effective surface area of the portion of the piston 140 adjoining chamber 148 is selected such that when the spool 160 is in its lowered position and only the portion of the piston 140 adjoining chamber 148 is at the pressure of the upstream pressure port 114, the fluid forces acting downwardly on the piston 140 will be smaller than the total of the upwardly acting forces (fluid forces+biasing force of range spring 175) at all pressure differentials which the piston 140 is likely to encounter during normal operation of the filter element. The piston 140 will move from its raised position to its lowered position only when both the inside of chamber 148 and the inside of the first cylindrical section 111 of the upper housing section 110 are at the pressure of the upstream pressure port 114, and in addition, when the pressure differential between the upstream and downstream pressure ports 114 and 181 is at least near the replacement differential pressure occurring when the filter element needs replacement due to clogging. Since, when the piston 140 is in its raised position, the first cylindrical section 111 is at the pressure of the upstream pressure port 114 only when the spool 160 is in its raised position, and since the spool 160 can move to its raised position only when the fluid temperature is at least the transition temperature of the first compression spring 165, it follows that the piston 140 is prevented from moving to its lowered position when the fluid is below the transition temperature, even if the pressure differential exceeds the actuation differential pressure of the piston 140. Thus, the indicator is prevented from actuating at low fluid temperatures at which the fluid being filtered has a high viscosity.

The switch housing 200 is detachably mounted atop the piston housing 100, and the two housings 100 and 200 are together secured to the filter housing 300 by suitable means such as bolts 304. The switch housing 200 contains an indicator button 230 supported for reciprocating linear movement between a retracted position shown by solid lines and an extended position shown by phantom lines in FIG. 1. The indicator button 230 is a hollow cylindrical member having a permanent magnet 231 disposed inside its lower end in a position opposing the magnet 141 mounted on the piston 140. The magnetic poles of the two magnets 141 and 231 are oriented such that the magnets are attracted toward each other. Magnet 231 is connected to the indicator button 230 by means of a metal armature 232 which fits inside the lower end of the indicator button 230. Magnet 231 and the armature 232 are slidably received inside a sleeve 120 which extends upward from the upper end of the piston housing 100, and the indicator button 230 is slidably mounted on the outer surface of the sleeve 120. The indicator button 230 is biased upward toward the extended position by a helical compression spring 233 disposed on the outside of the sleeve 120 between the indicator button 230 and the upper surface of the piston housing 100.

The upper end of the indicator button 230 can pass through an opening in the upper portion of the switch housing 200 and is slidably supported by a sleeve 234 installed in the opening. The opening is covered by a flexible transparent boot 235 of silicone rubber or similar material. The boot 235 protects the inside of the switch housing 200 from dirt and moisture and at the same time is sufficiently flexible to an enable an operator to manually depress the indicator button 230 through the boot 235. Because the boot 235 is transparent, it also enables an operator to see whether the indicator button 230 is retracted or extended. The upper end of the indicator button 230 can be dyed or painted a bright color to make it more visible in its extended position.

The movement of the indicator button 230 between its retracted and extended positions activates the microswitch 210 mounted within the switch housing 200. The microswitch 210 has a spring-loaded operating button 211 which contacts a lever 213 having one end pivotably supported by the switch housing 200 and a second end which fits into a slit formed in the indicator button 230. The microswitch 210 has three leads 212 connected to a standard electrical connector 220 mounted on the outer surface of the switch housing 200 by screws 221 or other suitable means. The movement of the operating button 211 changes the electrical connection among the leads 212. For example, in this embodiment, when the indicator button 230 is in its retracted position, the switch button 211 is in an extended position, and a first one of the leads 212 is electrically connected to a second one but not to a third one of the leads 212. When the indicator button 230 moves to its extended position, the switch button 211 is moved to a retracted position, and the first one of the leads 212 is electrically connected to the third one but not to the second one of the leads 212. However, a switch having a different number of leads and different connections among the leads can instead by employed. The three leads 212 of the microswitch 210 can be connected to an external electrical circuit so that the status of the microswitch 210, and therefore the position of the indicator button 230, can be determined from outside the indicator by electrical signals applied to the leads 212 through the connector 220. The external electrical circuit which senses the status of the microswitch 210 can be used to generate an alarm when the filter element needs replacement. For example, the microswitch 210 can be connected to an alarm device such as a buzzer or a warning light which generates an alarm when the indicator button 230 moves to its extended position. Alternatively, the microswitch 210 can be connected to an automatic control device which automatically shuts down the fluid system in which the filter element is installed when the microswitch 210 is switched by movement of the indicator button 230 to its extended position.

The thickness of the portion of the upper housing section 110 separating the magnets 141 and 231 is sufficiently thin to transmit magnetic forces between the magnets. When the piston 140 is in the raised position shown in FIG. 1, the magnetic attraction between the two magnets 141 and 231 is greater than the upward biasing force of the spring 233 acting on the indicator button 230, so the indicator button 230 is held in its retracted position by the attraction between the magnets. When the piston 140 moves to the lowered position, the attractive force between the two magnets 141 and 1231 becomes less than the biasing force of the spring 233, so the indicator button 230 pops upward to its extended position and actuates the microswitch 210. The microswitch 210 and the indicator button 230 thus both function as sensors which sense movement of the piston 140 between its raised (unactuated) and lowered (actuated) positions.

The indicator need not be equipped with; both a microswitch 210 and an indicator button 230, and either one is sufficient to alert the operator that the filter element has become clogged. Alternatively, a different sensing arrangement can be employed to sense the position of the piston 140. For example, the microswitch 210 and the indicator button 230 can be replaced by a conventional switch mechanism having a reed switch magnetically coupled to magnet 141, with the movement of the piston 140 and magnet 141 switching the reed switch between an open and a closed state. As another alternative, the piston 140 could be mechanically linked to an indicator button or an electric switch by a rod extending through a wall of the piston housing 100. Thus, the present invention can employ any arrangement capable of sensing movement of the piston 140.

The piston housing 100 and the switch housing 200 can be made of any materials which are compatible with the operating conditions of the indicator. Preferably, at least the portions of the housings 100 and 200 in the vicinity of the magnets 141 and 231 are nonmagnetic so that the magnets will not adhere to the housings. For example, the housings can be made of aluminum, stainless steel, titanium, plastic, or a composite material.

The operation of the indicator of FIG. 1 will be described while referring to FIGS. 2-5, which show the indicator in four different operating states. FIG. 2 illustrates the operating state at the time of a cold start, i.e., when the fluid system in which the filter element is installed is first turned on and the fluid being filtered is relatively cold and therefore highly viscous. Due to the high viscosity of the fluid, the pressure differential across the filter element may exceed the replacement pressure differential corresponding to a clogged state of the filter element, even though the filter element is not actually clogged. At this time, if the pressure at the upstream pressure port 114 is applied to the upper portion of the piston 140 inside the first cylindrical section 111 of the bore of the upper housing section 110, the pressure differential will cause the piston 140 to move to its lowered position, thus causing the indicator button 230 to move to its extended position and actuating the microswitch 210, thereby giving an erroneous indication that the filter element is clogged. Therefore, in this embodiment, when the fluid being filtered is below a prescribed temperature, the pressure at the upstream pressure port 114 is prevented from being transmitted to the upper portion of the piston 140. Namely, when the fluid temperature is below the transition temperature of the shape memory alloy, the biasing force of the second compression spring 166 is greater than the biasing force of the first compression spring 165, so the spool 160 is forced to its lowered position. In this state, passage 144, which communicates with the upstream pressure port 114, is isolated from passage 145 by the upper sealing member 162 of the spool 160. Furthermore, passage 145 is connected with the downstream pressure port 181 through the bore 164 in the spool 160, the recess 156 in the retainer 155, the passage 157 in the retainer 155, and the passage 171 in the piston stop 170. Therefore, both the lower portion of the piston 140 below sealing member 147 and the upper portion of the piston 140 above sealing member 146 are at the pressure of the downstream pressure port 181. At this time, the effective surface area of the piston 140 exposed to the pressure of the upstream pressure port 114 is sufficiently small that the downwardly acting forces on the piston 140 will not exceed the upwardly acting forces unless the pressure differential between the upstream and downstream pressures is an extremely high value which is not expected to occur during normal operation of the indicator. Thus, during a cold start, even if the pressure differential reaches the replacement differential pressure of the filter element and the actuation differential pressure of the piston 140 due to the high viscosity of the fluid, the piston 140 will not actuate, and the indicator is prevented from giving a false indication that the filter element is clogged.

FIG. 3 illustrates the state of the indicator during normal warm operation subsequent to a cold start, i.e., when the temperature of the fluid being filtered is above the transition temperature of the first compression spring 165 and the fluid differential pressure is below the replacement differential pressure of the filter element. At the transition temperature, the first compression spring 165 abruptly changes to its expanded state and greatly increases in stiffness so that the spring force which it exerts becomes greater than the spring force exerted by the second compression spring 166. Therefore, the spool 160 is moved to its raised position in which passages 144 and 145 communicate with each other. As a result, the upper portion of the piston 140 above sealing member 146 is exposed to the pressure of the upstream pressure port 114. Thus, below the transition temperature, the effective surface area of the piston 140 communicating with the upstream pressure port 114 is maintained constant, while at the transition temperature, it undergoes a stepwise increase. Since it is assumed that the filter element is not yet clogged, the difference between the upstream and downstream pressures is lower than the replacement differential pressure of the filter element and the actuation differential pressure of the piston 140, so the piston 140 remains in its raised position.

When the filter element becomes clogged, the pressure differential between the upstream and downstream pressure ports 114 and 181 reaches the replacement differential pressure of the filter element. As a result, the downward forces on the piston 140 exceed the upward forces, and the piston 140 is forced downward in the figures until the retainer 155 abuts against the top surface of the piston stop 170, as shown in FIG. 4. As the piston 140 moves downward, the latch cone 191 slides downward along the guide surface 183 of the insert 182 until the ledge 192 of the latch cone 191 slides over and engages with the bottom surface 184 of the insert 182 and prevents the piston 140 from moving upward again until the engagement between the latch cone 191 and the insert 182 is released.

When the piston 140 is in its lowered position, the magnetic attraction between the two magnets 141 and 231 is less than the spring force of the biasing spring 233 for the indicator button 230, so the indicator button 230 pops upward under the force of the biasing spring 233 to the extended position shown by phantom lines in FIG. 1. In the extended position, the indicator button 230 is clearly visible to an operator through the transparent boot 235 and thus provides a visual signal that the replacement differential pressure has been reached. The upward movement of the indicator button 230 also pivots the lever 213 in the clockwise direction, and the movement of the lever 213 actuates the microswitch 210 which causes electrical contacts to close, thereby indicating the actuation of the indicator.

The extension of the indicator button 230 is a sign that the filter element installed in the filter housing 300 has become clogged and needs to be replaced or cleaned. When the operator of the fluid system becomes aware of the extension of the indicator button 230, he will normally shut down the fluid system in preparation for servicing the filter element. After shutdown, the fluid gradually cools, and when the fluid temperature falls to a level at or below the transition temperature of the first compression spring 165, the spring 165 gradually decreases in stiffness, and the spring force exerted by the second compression spring 166 comes to exceed that exerted by the first compression spring 165, so the first compression spring 165 is compressed back to its initial shape shown in FIG. 2. As explained above, many shape memory alloys exhibit hysteresis, so the temperature at which the first compression spring 165 starts to lose its stiffness may be lower than the transition temperature. As the spring 165 is compressed, the spool 160 is forced back to its lowered position, as shown in FIG. 5. At the time of system shutdown, the pressure at the upstream pressure port 114 and the pressure at the downstream pressure port 181 become substantially the same, and in this state, the upward forces acting on the piston 140 (including the force exerted by the range spring 175) are greater than the downward forces. However, the latch cone 191 is still engaged with the insert 182, so the piston 140 remains in its lowered position until the latch cone 191 is released by the unillustrated release lever, upon which the piston 140 returns to its raised position.

In the states shown in FIGS. 2–4, the upstream and downstream pressure ports 114 and 181 are isolated from one another and there is no fluid flow between the pressure ports through the indicator. In contrast, in the state shown in Figure 5, it is possible for unfiltered fluid from the high pressure port 114 to flow to the low pressure port 181 through the center of the spool 160. However, at this time, since the fluid system has been shut down, there is no pressure differential between the pressure ports 114 and 181 and so there is no tendency for fluid to flow between the ports.

In this embodiment, when magnet 231 is in its raised position, the magnetic attraction between magnets 141 and 231 is smaller than the upward biasing force of spring 233, whether the piston 140 is in its raised or lowered position. In order to reset the indicator button 230 to its retracted position after the operator has allowed the piston 140 to return to its raised position by operating the release lever for the latch mechanism 190, the operator presses downward on the top of the indicator button 230 through the transparent boot 235 until the magnets 141 and 231 are sufficiently close for their magnetic attraction to overcome the biasing force of spring 233. When the indicator button 230 is pressed downwards, it pivots the lever 213 counterclockwise, and the button 211 of the microswitch 210 can return to its extended position so that the status of the microswitch 210 indicates that the indicator has returned to its initial state.

A differential pressure indicator according to the present invention has various advantages over a conventional indicator. As the first compression spring 165 is directly exposed to the fluid being filtered rather than to the atmosphere, it can accurately respond to changes in the temperature of the fluid being filtered. In a conventional indicator employing a bimetallic element to prevent actuation of the indicator at a low temperature, it is possible for the bimetallic element to become stuck in a latched position. In contrast, in the present invention, there are no members impeding the movement of the piston 140 from its raised to its lowered position, so there is no possibility of the piston 140 becoming stuck in its raised position.

Although the spool 160 is illustrated as being housed inside the piston 140, it can be housed in any location where it is in fluid communication with the outer surface of the piston 140 so as to vary the effective surface area of the piston 140 communicating with the upstream pressure port 114. For example, in instances in which the dimensions of the piston 140 are so small that it is impractical to dispose the spool 160 inside the piston 140, the spool 160 can be disposed within a wall of the piston housing 100. The same applies when a fluid control device other than a spool 160 is employed to control fluid flow to the outside of the piston 140.

Figure 6:
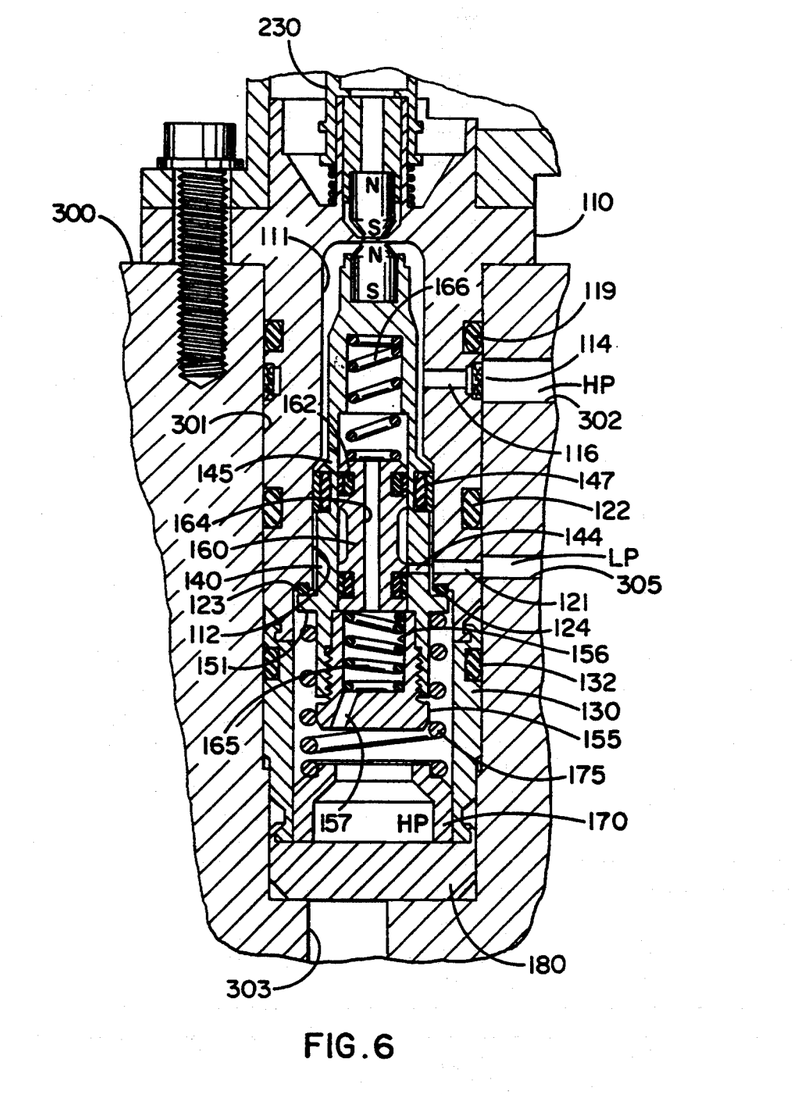
FIG. 6 is a vertical cross-sectional view of a portion of another embodiment of the present invention showing the piston in an unactuated state when the fluid is cold.
Figure 7:
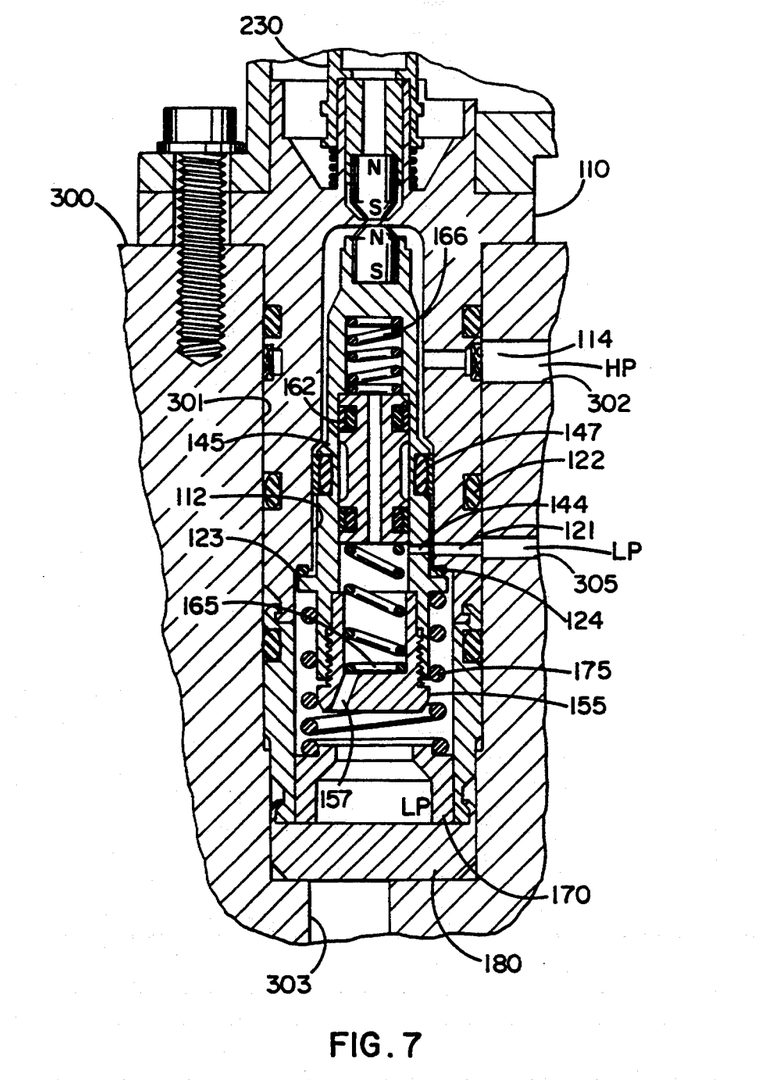
FIG. 7 shows the embodiment of FIG. 6 with the piston in an unactuated state when the fluid is warm.

In the previous embodiment, the effective surface area of the piston 140 communicating with the upstream pressure port 114 is increased at the transition temperature of the shape memory alloy. However, as shown in FIGS. 6 and 7, which illustrate a portion of another embodiment of the present invention, it is instead possible for the indicator to be structured such that the effective surface area of the piston 140 communicating with the upstream pressure port is decreased at the transition temperature. FIG. 6 illustrates this embodiment at the time of a cold start, and FIG. 7 illustrates the embodiment at the time of a warm start.

This embodiment is similar to the embodiment of FIG. 1, so only the differences from that embodiment will be described. The upstream pressure port 114 is moved upwards in the piston housing 100 so as to communicate with the first cylindrical section 111 of the bore in the upper housing section 110. The latching mechanism 190 is omitted, and the retainer 180 has a solid bottom and no longer provides fluid communication between the piston 140 and passage 303, which may be omitted. A passage 305 which has an inner end opening onto the bore 301 in the filter housing 300 and which communicates with the downstream side of the filter element is formed in the filter housing 300. A downstream pressure port 121 is formed through the wall of the upper housing section 110 between its inner and outer surfaces with the outer end of the downstream pressure port 121 communicating with passage 305.

On the piston 140, sealing member 146 is deleted, and passage 144 is moved to a location such that its inner end is always isolated from passage 145 by one of the sealing members 162 of the spool 160. Its outer end communicates with the downstream pressure port 121 through a gap between the outer surface of the piston 140 and the inner surface of the second cylindrical section 112 of the upper housing section 110. A circular flange 151 is formed on the lower end of the piston 140 around its entire periphery, and a circular ledge 123 is formed on the lower end of the upper housing section 110 around its entire periphery opposite the flange 151. A sealing member 124 such as an O-ring is mounted in a groove on the ledge 123 opposing the upper surface of the flange 151 or in any other suitable location. When the piston 140 is in its raised position as shown in these figures, the upward force exerted on the piston 140 by the range spring 175 and fluid forces creates a fluid-tight seal between the flange 151 and sealing member 124.

In the embodiment of FIG. 1, when the piston 140 is in its raised position and the spool 160 is in its lowered position, the lower portion of the piston 140 below sealing member 147 and the upper portion of the piston 140 above sealing member 146 are at the pressure of the downstream pressure port 181. In contrast, in the present embodiment, when the piston 140 is in its raised position and the spool 160 is in its lowered position, both the lower portion of the piston 140 below sealing member 124 and the upper portion of the piston 140 above sealing member 147 are at the pressure of the upstream pressure port 114 (indicated in FIGS. 6 and 7 as HP for "high pressure"), and only the portion of the piston 140 between sealing member 147 and sealing member 124 are at the pressure of the downstream pressure port 121 (indicated in FIGS. 6 and 7 as LP for "low pressure"). Namely, the lower portion of the piston 140 communicates with the upstream pressure port 114 through radial passage 116, through the gap between the first cylindrical section 111 of the bore in the upper housing section 110 and the outside of the piston 140, through passage 145, through the central bore 164 in the spool 160, and through the recess 156 and the passage 157 in the spring retainer 155. The effective surface areas of the portions of the piston 140 subjected to the upstream and downstream pressures when the spool 160 is in its lowered position are preferably such that the fluid forces acting downwardly on the piston 140 are smaller than the total of the upwardly acting forces (fluid forces+biasing force of the range spring 175) at all pressure differentials likely to be encountered during normal operation. Thus, when the spool 160 is in its lowered position, the piston 140 will not move to its lowered position even if the pressure differential exceeds the actuation differential pressure for the piston 140 at a low fluid temperature at which the fluid viscosity is high.

When the temperature of the fluid being filtered reaches the transition temperature of the shape memory alloy of which the first compression spring 165 is formed, the spring 165 abruptly increases in stiffness and overcomes the downwards biasing force of the second compression spring 166. As a result, the first compression spring 165 forces the spool 160 to the raised position shown in FIG. 7. In this position, the upstream pressure port 114 still communicates with the upper portion of the piston 140 above sealing member 147. However, the inner end of passage 145 is now isolated from the portions of the inside of the piston 140 above and below the spool 160. Furthermore, the inner end of passage 144 now communicates with the inside of the bore 143 of the piston 140 beneath the spool 160. As a result, the fluid pressure within the recess 156 of the spring retainer 155, inside of the piston 140 above the spool 160, and on the lower portion of the piston 140 beneath sealing member 124 for the flange 123 becomes the pressure of the downstream pressure port 121. Thus, the effective surface area of the piston 140 communicating with the upstream pressure port 114 is decreased at the transition temperature of the shape memory alloy. In the state shown in FIG. 7, the pressure differential between the upstream and downstream pressure ports 114 and 121 is below the actuation differential pressure of the piston 140, but as soon as the differential pressure reaches the actuation differential pressure, the piston 140 will actuate and be driven downwards, thus actuating the indicator button 230 and the unillustrated microswitch 210 in the same manner as described above with respect to the embodiment of FIG. 1.

What is claimed is:

1. A differential pressure indicator comprising:
    a housing having first and second pressure ports and a bore communicating with the pressure ports;
    a piston movable in the bore between an actuated and an unactuated position in response to a pressure differential between the first and second pressure ports;
    a sensor for sensing movement of the piston from one of the positions to the other; and
    a fluid control mechanism fluidly coupled to the piston to vary a surface area of the piston communicating with the first pressure port when the piston is in the unactuated position in accordance with variations in temperature of fluid at one of the pressure ports.

2. An indicator according to claim 1 wherein the fluid control mechanism increases the surface area of the piston communicating with the first pressure port as the fluid temperature increases.

3. An indicator according to claim 1 wherein the fluid control mechanism decreases the surface area of the piston communicating with the first pressure port as the fluid temperature increases.

4. An indicator according to claim 1 wherein the fluid control mechanism maintains the surface area of the piston communicating with the first pressure port constant below a predetermined temperature and produces a step change in the surface area of the piston communicating with the first pressure port at the predetermined temperature.

5. An indicator according to claim 1 wherein the sensor includes an electric switch responsive to movement of the piston.

6. An indicator according to claim 1 wherein the sensor includes a visual indicator for visually indicating the position of the piston.

7. An indicator according to claim 1 including a first magnet mounted on the piston for movement therewith, wherein the sensor comprises:
    an indicating member supported by the housing for movement between a first position and a second position in which the indicating member provides a visual indication;
    a second magnet mounted on the indicating member; and
    a biasing member exerting a biasing force on the indicating member towards its second position,
    wherein magnetic attraction between the first and second magnets is greater than the biasing force exerted by the biasing member on the indicating member when the piston is in its unactuated position and is less than the biasing force exerted by the biasing member on the indicating member when the piston is in its actuated position.

8. An indicator according to claim 7 wherein the sensor includes an electric switch actuated by movement of the indicating member between its first and second positions.

9. An indicator according to claim 1 wherein the fluid control mechanism comprises:
    a shuttle received in a bore of the piston and movable between first and second positions to vary a surface area of the piston communicating with the first pressure port; and
    a first shuttle biasing member made from a shape memory alloy having a transition temperature and coupled to the shuttle to drive the shuttle between its first and second positions at the transition temperature.

10. An indicator according to claim 9 wherein the first shuttle biasing member comprises a spring disposed in the piston bore.

11. An indicator according to claim 9 comprising a second shuttle biasing member exerting a biasing force on the shuttle in a direction opposite the first shuttle biasing member, wherein the biasing force exerted by the first shuttle biasing member is greater than the biasing force exerted by the second shuttle biasing member at a fluid temperature above the transition temperature, and the biasing force exerted by the first shuttle biasing member is less than the biasing force exerted by the second shuttle biasing member at a fluid temperature below the transition temperature.

12. An indicator according to claim 11 wherein the second shuttle biasing member comprises a spring disposed in the piston bore and coupled to the shuttle.

13. An indicator according to claim 9 wherein the first shuttle biasing member is in fluid communication with one of the pressure ports.

14. An indicator according to claim 9 wherein the shuttle has first and second end surfaces and a bore communicating between the first and second end surfaces for equalizing fluid pressure at the first and second end surfaces.

15. An indicator according to claim 9 wherein the modulus of elasticity of the shape memory alloy increases at the transition temperature.

16. An indicator according to claim 9 wherein:
the piston has a first passage and a second passage each extending between the bore of the piston and the outer periphery of the piston, the first passage communicating with the first pressure port;
the shuttle in its first position prevents fluid communication between the first and second passages and in its second position allows fluid communication between the passages; and
the first shuttle biasing member drives the shuttle toward its second position at the transition temperature.

17. An indicator according to claim 9 wherein:
the piston has a first passage and a second passage each extending between the bore of the piston and the outer periphery of the piston, the first passage communicating with the first pressure port and the second passage communicating with the second pressure port;
the shuttle in its first position allows communication between an external surface of the piston and the first but not the second passage and in its second position allows communication between the external surface and the second but not the first passage, the external surface being oriented such that fluid pressure acting thereon exerts a force urging the piston towards its unactuated position; and
the first shuttle biasing member drives the shuttle toward its second position at the transition temperature.

18. An indicator according to claim 1 including a latch mechanism for releasably latching the piston in its actuated position.

19. A differential pressure indicator comprising:
a housing having a high pressure port, a low pressure port, and a bore communicating with the pressure ports;
a piston slidable in the bore of the housing between an actuated and an unactuated position and having an internal bore;
a sensor for sensing movement of the piston to the actuated position;
a shuttle slidably received in the piston bore and axially movable between a first position and a second position, the shuttle providing communication between a first surface area of the piston and the high pressure port when the shuttle is in its first position and the piston is in its unactuated position and providing communication between a second surface area of the piston and the high pressure port when the shuttle is in its second position and the piston is in its unactuated position, the first surface area being different from the second surface area; and a first shuttle biasing spring disposed in the piston bore and exerting a biasing force on the shuttle toward the first position and a second shuttle biasing spring disposed in the piston bore and exerting a biasing force on the shuttle toward the second position, the first shuttle biasing spring being in fluid communication with one of the pressure ports and being made from a shape memory alloy having a transition temperature, the biasing force exerted by the first shuttle biasing spring increasing with temperature and being greater than the biasing force exerted by the second shuttle biasing spring at a fluid temperature above the transition temperature and being less than the biasing force exerted by the second shuttle biasing spring at a fluid temperature below the transition temperature.

20. A differential pressure indicator comprising:
a housing having high and low pressure ports and a bore communicating with the pressure ports;
a piston movable in the bore between an actuated and an unactuated position, the piston having a first region and a second region and movable from the unactuated to the actuated position when a differential between pressure acting on the first region and pressure acting on the second region exceeds a predetermined actuation differential pressure;
a sensor for sensing movement of the piston from one of the positions to the other;
a fluid control valve fluidly connected to the high pressure port, the low pressure port, and one of the regions of the piston when the piston is in its unactuated position, the valve having a first setting in which the valve fluidly connects the low pressure port to the one of the regions of the piston and a second setting in which the valve fluidly connects the high pressure port to the one of the regions of the piston; and
an actuating member of a shape memory alloy having a transition temperature, the actuating member being in fluid communication with one of the pressure ports and being operatively coupled to the valve to switch the valve between its first setting and its second setting when a fluid temperature at the one of the pressure ports reaches the transition temperature.

21. A differential pressure indicator comprising:
a housing having high and low pressure ports and a bore communicating with the pressure ports;
a piston having first and second ends and movable in the bore in response to a pressure differential between the first and second ends;
a sensor for sensing a position of the piston within the bore; and
a fluid control mechanism including a valve and a shape memory alloy operatively connected to the valve for switching the valve between operating states, the valve being in fluid communication with the bore having a first operating state in which the high pressure port communicates with one end of the piston and a second operating state in which the low pressure port communicates with the one end of the piston.

* * * * *